Dec. 17, 1940.  W. MENDIUS  2,225,347
CATALYTIC CONDENSATION OF HYDROCARBONS
Filed July 30, 1938
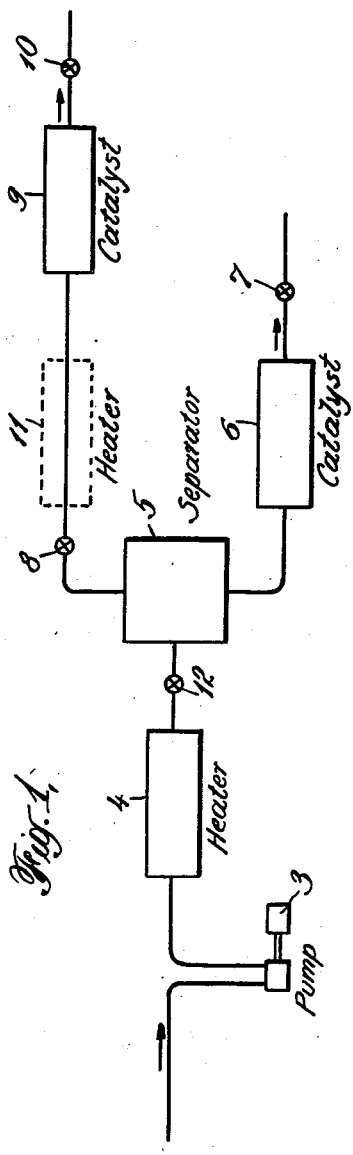
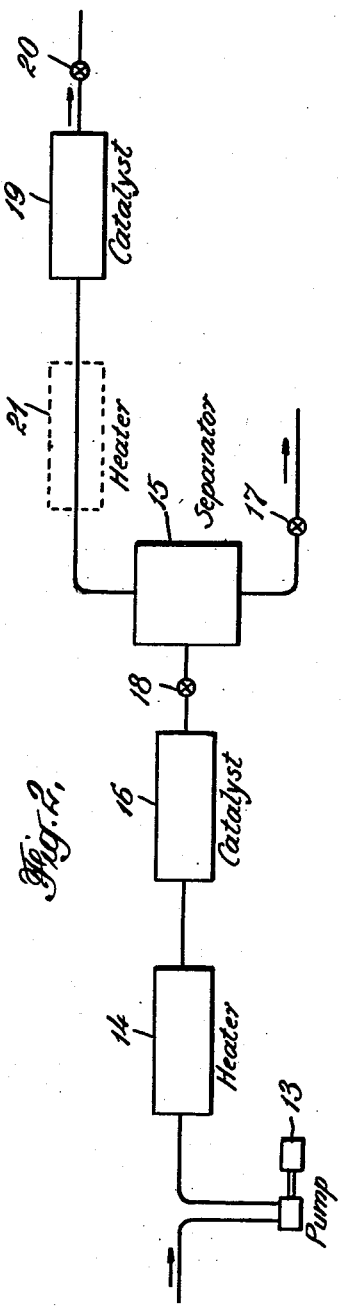
INVENTOR
William Mendius
BY
Pennie, Davis, Marvin & Edmonds
ATTORNEYS Patented Dec. 17, 1940

2,225,347

UNITED STATES PATENT OFFICE 2,225,347

CATALYTIC CONDENSATION OF HYDROCARBONS

William Mendius, Munster, Ind., assignor to Sinclair Refining Company, New York, N. Y., a corporation of Maine Application July 30, 1938, Serial No. 222,138

7 Claims. (Cl. 196—10)

This invention relates to improvements in the catalytic condensation of normally gaseous hydrocarbons to produce normally liquid hydrocarbons of gasoline boiling range.

The normally gaseous hydrocarbons to which I refer more particularly are those saturated, or paraffin, and unsaturated, or olefin, hydrocarbons containing four and less carbon atoms per molecule, methane, ethane, ethylene, propane, propylene, normal butane, isobutane, normal butylene and isobutylene. These hydrocarbons may be designated the $C_1$, $C_2$, $C_3$ and $C_4$ compounds, or collectively, $C_{4-}$ compounds. The normally liquid hydrocarbons to which I refer are those containing five or six or more carbon atoms per molecule within the boiling range of gasoline, which may be designated the $C_{5+}$ or $C_{6+}$ compounds.

The term "catalytic condensation" as applied to such hydrocarbons includes polymerization of unsaturates and alkylation or reaction between saturates and unsaturates. Catalytic polymerization of unsaturates has been proposed and practiced as a method of recovering motor fuel gasoline of special value from less valuable hydrocarbon gas mixtures containing sufficient unsaturated compounds. Gas mixtures so processed have included gas mixtures from cracking operations containing as produced sufficient unsaturated components and gas mixtures preliminarily processed catalytically or thermally to produce sufficient unsaturated components by decomposition of saturated components. While some of these previous proposals and practices may have involved incidental alkylation, the conditions of operation have tended to suppress alkylation rather than promote this type of reaction. Alkylation and polymerization are, in some respects, inconsistent reactions and, consequently, it is not unnatural that those seeking to effect condensation by polymerization should have avoided conditions promoting alkylation.

In a co-pending application, Serial Number 204,736, filed April 28, 1938, Patent No. 2,177,579, Roderick Donald Pinkerton and I disclose that by appropriate correlation of charging stock, temperature, pressure and catalyst, condensation with substantial alkylation may be effected either with concurrent polymerization or to the substantial exclusion of polymerization and that, by means of such correlation, gasoline-like hydrocarbon products superior in important respect to those of polymerization processes in which alkylation, if occurring at all, is merely incidental, may be produced from normally gaseous hydrocarbons including saturates and unsaturates.

According to this invention, an operation effecting condensation with substantial alkylation is combined in a special manner with an operation effecting condensation with incidental alkylation but with substantial concurrent polymerization to secure several advantages.

In carrying out one embodiment of the process of this invention, a mixture of normally gaseous hydrocarbons including saturates and unsaturates is heated to a reaction temperature not exceeding the critical temperature of the mixture under a pressure sufficient to maintain a substantial part of the mixture in liquid phase, the vapor phase is separated from the liquid phase under maintained pressure, the separated liquid phase is passed in contact with condensation catalyst at a temperature effecting alkylation not exceeding the critical temperature of the mixture under maintained pressure sufficient to maintain the liquid phase, the separated vapor phase is passed in contact with a condensation catalyst, at a temperature effecting polymerization and the liquid products of both condensations are collected. The vapor phase catalyst contact is with advantage carried out under pressure lower than that of the liquid phase catalyst contact. Also, the vapor phase catalyst contact is with advantage carried out at a temperature higher than that of the liquid phase catalyst contact. Thus, the separated vapor phase may be further heated prior to the vapor phase catalyst contact. In carrying out another embodiment of the process of the invention, a mixture of normally gaseous hydrocarbons including saturates and unsaturates is heated to a reaction temperature not exceeding the critical temperature of the mixture and is then passed in contact with a condensation catalyst at a temperature effecting alkylation while under a pressure sufficient to maintain it in liquid phase, the pressure on the mixture is then reduced, this pressure reduction being limited to prevent substantial vaporization of hydrocarbons of gasoline boiling range, the resulting vapor phase is separated from the liquid phase, the separated vapor phase is passed in contact with a condensation catalyst at a temperature effecting polymerization and the liquid phase separated following the liquid phase catalyst contact and the liquid products of the second condensation are collected. In both embodiments of the process of my invention, a condensation primarily adapted to effect alkylation, although it may include polymerization, is combined with a condensation adapted to effect polymerization in a manner promoting more complete reaction of those constituents of the charge capable of reaction to produce liquid hydrocarbons of gasoline boiling range. Also, in both embodiments of the process of the invention, appropriate condensation conditions are selectively applied to the varying hydrocarbons making up the material being processed. The paraffins are apparently more reactive with respect to alkylation as they decrease in molecular size. Thus, in the second embodiment, such relatively more reactive paraffins are maintained present in maximum concentration in both condensations. At the same time, in the second embodiment, although the condensation reaction is carried on in the second condensation to promote complete reaction and consequently high recovery, liquid products of the first condensation are withdrawn prior to the second condensation avoiding any tendency toward continued condensation of these products with possible production of material higher boiling than gasoline.

Known condensation catalysts are generally useful in carrying out the process of the invention. The phosphoric acid catalysts will illustrate one type of catalyst which may be employed to advantage. An appropriate phosphoric acid catalyst may be prepared, for example, by mixing orthophosphoric acid or pyrophosphoric acid with an appropriate carrier, siliceous material such as kieselguhr or an aluminum silicate for example, and calcining the mixture at a temperature of 575° F. or 750° F. The calcined catalyst may comprise three parts by weight of the phosphoric acid compound and one part by weight of the carrier for example. The calcined mixture may be ground and sized or pelleted, or some carbonaceous material may be incorporated into the mixture prior to calcination to render the calcined product porous.

The hydrocarbon mixture to be processed may include, as supplied to the regions of catalyst contact, an added gasoline fraction substantially free from cracked constituents as described in a co-pending application of Roderick Donald Pinkerton, Serial Number 204,737, filed April 28, 1938.

The accompanying drawing illustrates, diagrammatically and conventionally, as a flow diagram, two arrangements of apparatus appropriate for carrying out the first and second embodiments of the process of the invention in Figure 1 and Figure 2, respectively.

In the arrangement illustrated in Figure 1, the normally gaseous hydrocarbons including saturates and unsaturates to be processed are forced by means of pump 3 through the heater 4 into the separator 5. In the heater 4 the hydrocarbon mixture is heated for example to 250° F.–350° F. and in the separator 5 a pressure for example of 500–1000 pounds per square inch is maintained. The heater 4 may discharge at a pressure approximating that prevailing in the separator 5, or the pressure may be reduced between the heater and the separator, by means of valve 12, in which case the heater may be operated under a pressure sufficient to prevent any substantial vaporization therein. From the separator 5, the separated liquid material is discharged under maintained pressure through the chamber 6 containing an appropriate condensation catalyst in which this material is contacted in liquid phase with the condensation catalyst at a temperature for example of 250° F.–350° F. and under a pressure approximating that prevailing in the separator 5, pressure being maintained and regulated by means of valve 7 in conjunction with valve 10 or valve 8 and valve 10. The separated vaporized material is discharged from the separator 5 through the chamber 9 containing an appropriate condensation catalyst. This vaporized material may be further heated in a supplementary heater 11 after leaving the separator 5 and before entering the chamber 9, and the pressure on this vaporized material may be reduced as it passes through valve 8. In the chamber 9, this vaporized material is passed in contact with the condensation catalyst at a temperature for example of 350° F.–650° F. and under a pressure for example of 250–650 pounds per square inch. The normally liquid hydrocarbon products of both condensations are recovered conventionally from the hydrocarbon mixtures discharged from the liquid phase contact and the vapor phase contact, respectively, through valves 7 and 10.

In the arrangement illustrated in Figure 2 the normally gaseous hydrocarbons including saturates and unsaturates to be processed are forced by means of pump 13 through the heater 14 and the chamber 16 containing an appropriate condensation catalyst into the separator 15. In the heater 14, the hydrocarbon mixture is heated to a reaction temperature not exceeding the critical temperature of the mixture, and, by means of valve 18, a pressure sufficient to maintain the mixture in liquid phase is maintained through the heater 14 and the chamber 16. The temperature in the chamber 16 may approximate, for example, 200° F.–350° F., and the pressure therein may approximate, for example, 500–1500 pounds per square inch. A lower pressure, low enough to permit vaporization of constituents lower boiling than gasoline but high enough to prevent vaporization of hydrocarbons of gasoline boiling range at the prevailing temperature, is maintained in the separator 15. The pressure in this separator may approximate for example 150–350 pounds per square inch. The material separating as a liquid in the separator 15 is discharged through valve 17. The vaporized material separating in separator 15 is discharged under maintained pressure through chamber 19 containing an appropriate condensation catalyst and thence through valve 20. The material discharged from the separator 15 to the chamber 19 may be passed through a supplemetary heater 21. The temperature maintained in the chamber 19 may approximate for example 350° F.–650° F. and the pressure may approximate for example 150–350 pounds per square inch.

The normally liquid hydrocarbon products of both condensations are recovered conventionally from the hydrocarbon mixtures discharged through valves 17 and 20, the materials discharged through valve 20 having passed through both the liquid phase contact and the vapor phase contact.

In both embodiments of the process of the invention, the liquid phase contact is with advantage carried out as described in the previously mentioned application Serial Number 204,736, with the further correlation of temperature and pressure appropriate to the maintenance of liquid phase conditions within the region of catalyst contact.

Since lower temperatures tend to promote alkylation and to suppress polymerization, whereas higher temperatures, at least within the range within which alkylation tends to be effected, tend to promote polymerization and to suppress alkylation and since in general higher pressures tend to promote alkylation whereas lower pressures tend to promote polymerization, alkylation is promoted and polymerization is suppressed although not necessarily excluded in the liquid phase catalyst contact of the combined operation of this invention and complete reaction, particularly of unsaturates, is promoted in the vapor phase catalyst contact of the combined operation of the invention.

Thus, good recoveries of liquid products of gasoline boiling range are obtained and at the same time the superior properties characteristic of products of condensation by alkylation are retained in improved measure.

I claim:

1. In the catalytic condensation of normally gaseous hydrocarbons including saturates and unsaturates to produce normally liquid hydrocarbons of gasoline boiling range, the improvement which comprises heating the normally gaseous hydrocarbons to a reaction temperature of 200°–350° F. but not exceeding the critical temperature of the mixture under a pressure sufficient to maintain a substantial part of the mixture in liquid phase, separating vapor phase from liquid phase under maintained pressure, passing the separated liquid phase in contact with a condensation catalyst at a temperature effecting alkylation but not exceeding the critical temperature of the mixture under maintained pressure upwards of 500 pounds per square inch and sufficient to effect substantial alkylation and to maintain the liquid phase, passing the separated vapor phase in contact with a condensation catalyst at a temperature effecting polymerization and collecting the liquid products of both of the resulting condensations.

2. In the catalytic condensation of normally gaseous hydrocarbons including saturates and unsaturates to produce normally liquid hydrocarbons of gasoline boiling range, the improvement which comprises heating the normally gaseous hydrocarbons to a reaction temperature of 200°–350° F. but not exceeding the critical temperature of the mixture under a pressure sufficient to maintain a substantial part of the mixture in liquid phase, separating vapor phase from liquid phase under maintained pressure, passing the separated liquid phase in contact with a condensation catalyst at a temperature effecting alkylation but not exceeding the critical temperature of the mixture under maintained pressure upwards of 500 pounds per square inch and sufficient to effect substantial alkylation and to maintain the liquid phase, passing the separated vapor phase in contact with a condensation catalyst at a temperature effecting polymerization and under pressure lower than that of the liquid phase contact, and collecting the liquid products of both of the resulting condensations.

3. In the catalytic condensation of normally gaseous hydrocarbons including saturates and unsaturates to produce normally liquid hydrocarbons of gasoline boiling range, the improvement which comprises heating the normally gaseous hydrocarbons to a reaction temperature of 200°–350° F. but not exceeding the critical temperature of the mixture under a pressure sufficient to maintain a substantial part of the mixture in liquid phase; separating vapor phase from liquid phase under maintained pressure, passing the separated liquid phase in contact with a condensation catalyst at a temperature effecting alkylation but not exceeding the critical temperature of the mixture under maintained pressure upwards of 500 pounds per square inch and sufficient to effect substantial alkylation and to maintain the liquid phase, passing the separated vapor phase in contact with a condensation catalyst at a temperature effecting polymerization higher than that of the liquid phase contact and under a pressure lower than that of the liquid phase contact, and collecting the liquid products of both of the resulting condensations.

4. In the catalytic condensation of normally gaseous hydrocarbons including saturates and unsaturates to produce normally liquid hydrocarbons of gasoline boiling range, the improvement which comprises heating the normally gaseous hydrocarbons to a reaction temperature of 200°–350° F. but not exceeding the critical temperature of the mixture under a pressure sufficient to maintain a substantial part of the mixture in liquid phase, separating vapor phase from liquid phase under maintained pressure, passing the separated liquid phase in contact with a condensation catalyst under maintained pressure upwards of 500 pounds per square inch and sufficient to effect substantial alkylation and to maintain the liquid phase, further heating the separated vapor phase and passing it in contact with a condensation catalyst and collecting the liquid products of both of the resulting condensations.

5. In the catalytic condensation of normally gaseous hydrocarbons including saturates and unsaturates to produce normally liquid hydrocarbons of gasoline boiling range, the improvement which comprises heating the normally gaseous hydrocarbons to a reaction temperature of 200°–350° F. but not exceeding the critical temperature of the mixture under a pressure sufficient to maintain a substantial part of the mixture in liquid phase, separating vapor phase from liquid phase under maintained pressure, passing the separated liquid phase in contact with a condensation catalyst at a temperature effecting alkylation but not exceeding the critical temperature of the mixture under maintained pressure upwards of 500 pounds per square inch and sufficient to effect substantial alkylation and to maintain the liquid phase, further heating the separated vapor phase and passing it in contact with a condensation catalyst at a temperature effecting polymerization and collecting the liquid products of both of the resulting condensations.

6. In the catalytic condensation of normally gaseous hydrocarbons including saturates and unsaturates to produce normally liquid hydrocarbons of gasoline boiling range, the improvement which comprises heating the normally gaseous hydrocarbons to a reaction temperature of 200°–350° F. but not exceeding the critical temperature of the mixture and passing it in contact with a condensation catalyst while under a pressure upwards of 500 pounds per square inch and sufficient to effect substantial alkylation and to maintain it in liquid phase, reducing the pressure of the mixture and separating the resulting vapor phase from the liquid phase, this pressure reduction being limited to prevent substantial vaporization of hydrocarbons of gasoline boiling range, passing the separated vapor phase in contact with a condensation catalyst at a temperature effecting polymerization and collecting the separated liquid phase and the liquid products of the catalytic condensation of the vapor phase.

7. In the catalytic condensation of normally gaseous hydrocarbons including saturates and unsaturates to produce normally liquid hydrocarbons of gasoline boiling range, the improvement which comprises heating the normally gaseous hydrocarbons to a reaction temperature of 200°–350° F. but not exceeding the critical temperature of the mixture under a pressure sufficient to maintain a substantial part of the mixture in liquid phase, passing the liquid phase component in contact with a condensation catalyst at a temperature effecting alkylation while under a pressure upwards of 500 pounds per square inch and sufficient to effect substantial alkylation and to maintain said component in the liquid phase, separating a vapor phase component from the heated mixture and separately passing said vapor phase component in contact with a condensation catalyst at a temperature effecting polymerization and collecting the liquid products of the resulting condensations.

WILLIAM MENDIUS.